June 2, 1931. L. C. BILLOTTE ET AL 1,808,397
METHOD OF AND APPARATUS FOR LOCATING DEPOSITS OF OIL,
GAS, AND OTHER DIELECTRIC SUBTERRANEAN BODIES
Filed Dec. 2, 1927  2 Sheets-Sheet 1
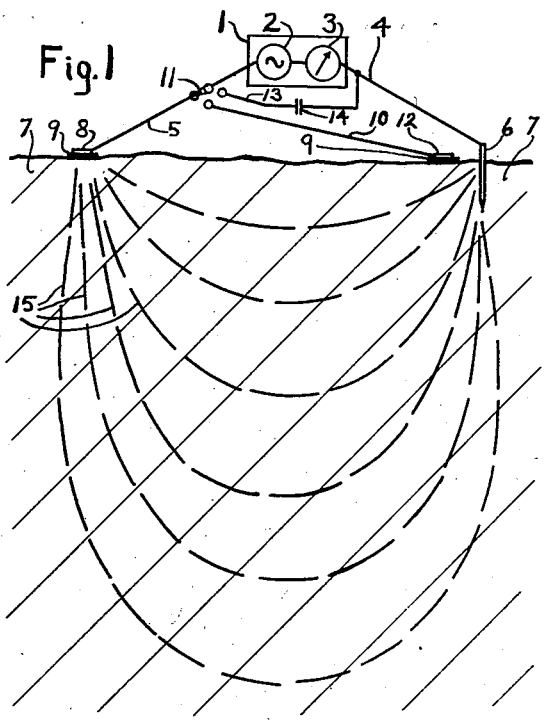
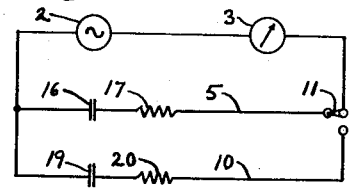
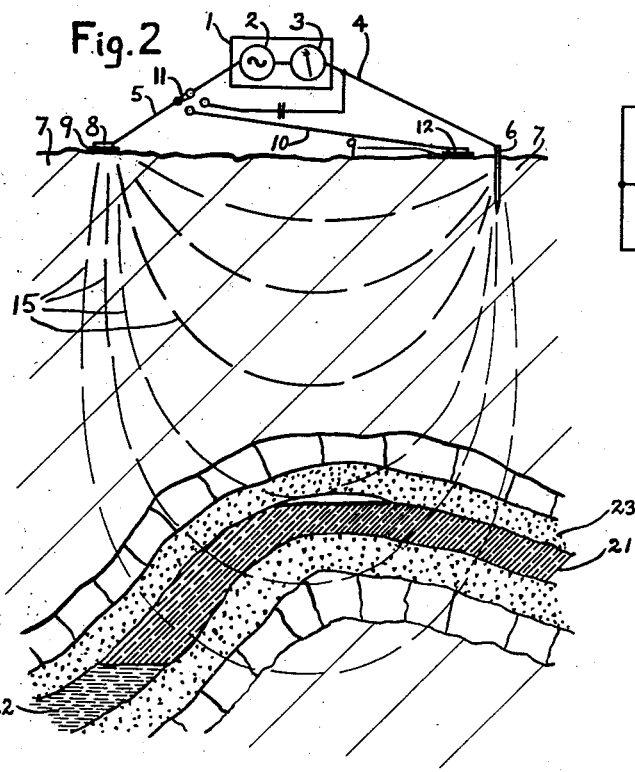
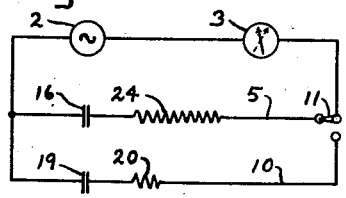
INVENTORS
Louis C. Billotte
Edward Libson
BY
ATTORNEY

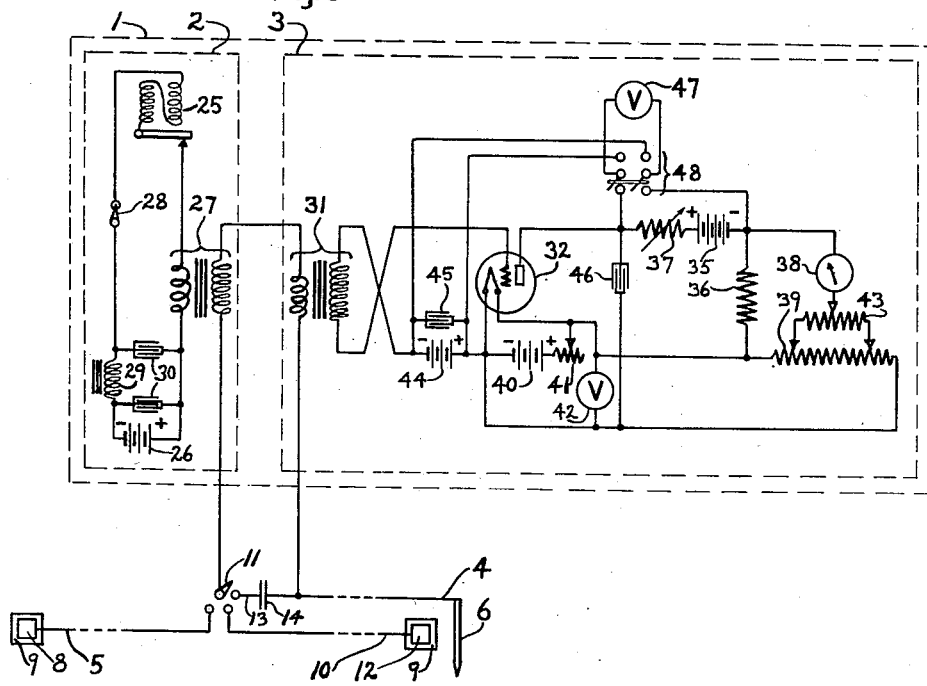

Patented June 2, 1931

1,808,397

UNITED STATES PATENT OFFICE

LOUIS C. BILLOTTE, OF REVERE, AND EDWARD LIPSON, OF CHELSEA, MASSACHUSETTS, ASSIGNORS TO OIL FINDING CORPORATION, A CORPORATION OF DELAWARE

METHOD OF AND APPARATUS FOR LOCATING DEPOSITS OF OIL, GAS AND OTHER DI-ELECTRIC SUBTERRANEAN BODIES

Application filed December 2, 1927. Serial No. 237,133.

Our invention relates to an improved method and apparatus which have been particularly designed for use in the location of deposits of oil and gas, but may also be used in locating other subterranean deposits having relatively high dielectric characteristics compared with the surrounding medium. By our invention we have found it possible to locate oil fields, for example, and to accurately define the area thereof, as well as to determine the sections of the field where the deposits are of largest value. Not only are we enabled to locate the subterranean deposits with great accuracy, but we are also able to approximately measure the quantity or bulk thereof.

The invention also enables us to distinguish between subterranean deposits of oil and gas, as we will hereafter explain.

Our invention is based on the fact that when a current of relatively high frequency is permitted to enter the earth through spaced electrodes, the observed effect is different when a deposit of a high dielectric nature, such as oil or gas lies beneath the electrodes than when such deposit is not present. Obviously, since the deposits are subterranean, the explanation of the principle underlying the invention is a matter of hypothesis. A reasonable explanation of the results we have been able to secure, as we will point out hereafter, is that the dielectric deposit acts as a condenser of small electrostatic capacity and thus produces a different effect observable at the surface, than when it is not present. If the subterranean deposit does not act as a condenser, it may act to increase the resistance of the current paths and thus result in a different observation, but whatever the explanation of the phenomenon may be, we have been able by our method and apparatus to accurately locate and determine the approximate size of oil and gas deposits whose presence has been subsequently verified by actual drilling.

In carrying our method into effect, we first make use of two electrodes, one of which may be a conducting bar driven into the ground and the other a conducting plate spaced from the surface of the ground by a suitable dielectric, and constituting a condenser of known electrostatic capacity. These electrodes are spaced a suitable distance apart and a source of high frequency energy is then applied to the electrodes. Currents in this way are caused to enter the earth and pass between the electrodes in many paths, some of which may extend miles below the surface. The energy employed is preferably very small, in order that the apparatus employed may be a portable and rugged one, but currents of high value may be used, if portability of the apparatus is unimportant.

The source of high frequency electric current is adjusted to have a predetermined energization to provide a standard for reference purposes, as will be explained later. By predetermined energization we mean that the voltage is adjusted to a predetermined value or that the electrical energy delivered by the source is of a predetermined value as measured in terms of some other unit.

Assuming the predetermined energization is based on a standard voltage applied to the electrodes referred to, the current transmitted over the path through the earth between the electrodes assumes a value determined by the impedance of the path. This current is measured by suitable means such as a micro-ammeter or other apparatus capable of accurately measuring very small currents. We now obtain a second reading of current with the same predetermined energization of the source of high frequency when the conducting path through the earth is considerably shortened by having electrodes close to each other rather than spaced relatively far apart. The value of current through the short path then indicates whether oil or other dielectric matter is present below the surface where the measurements are made. In other words, if the readings through the long and short paths, respectively, are coincident, no dielectric deposit is present within the range of the apparatus, while if the two readings are different, the presence of such body is indicated.

Furthermore, the amount of the difference between the two readings is indicative of the quantity or bulk of the dielectric deposit.

Our improved apparatus for carrying the method into effect is provided with the two electrodes referred to and preferably is provided with a third electrode having the same characteristics as the plate electrode used in the first reading, a switch being employed to transfer the connections from one plate to the other. A suitable source of high frequency current is also used and a portable device may employ a buzzer generating currents of the desired frequency. A suitable current measuring instrument may be employed, when the source of energy is adjusted to have a standard voltage. This instrument may be an accurate micro-ammeter.

We have obtained entirely satisfactory results with a direct current micro-ammeter and in such a case it is necessary to make use of a suitable device for producing a direct current in response to the high frequency current. A rectifying detector of the three-electrode type, having an amplifying characteristic serves well for this purpose.

Preferably in assembling the apparatus we make use of the various expedients which have been developed in the radio art to prevent the undesired passage of electric energy between the leads of other parts of the circuit, as a result of electrostatic or magnetic coupling between these parts. Owing to the very sensitive response of the current indicating system, a capacity of even a few micro-micro-farads between adjacent parts of the apparatus, may give rise to undesired shunt paths or cicruits producing errors in the readings of the instrument, and great care must be exercised in eliminating these possible sources of error.

In order that the invention may be better understood, attention is directed to the accompanying drawings, forming part of this specification and in which Fig. 1, is a diagram illustrating the apparatus conventionally in the carrying out of the method employed where no dielectric body is present.

Fig. 2, is a similar view, showing the conventional representation of a layer of oil sand below the apparatus.

Fig. 3, is schematic diagram of a circuit illustrating the conditions corresponding to conditions shown in Fig. 1.

Fig. 4, is a schematic diagram of a circuit corresponding to conditions shown in Fig. 2, and Fig. 5, is a simplified diagram of the apparatus in its preferred form.

In all of the above views corresponding parts are represented by the same numerals.

In Fig. 1, the apparatus 1, including the source of alternating current 2 and the current indicator 3 is connected in series with conducting leads 4 and 5. Conductor 4 terminates in an electrode 6 in the form of a bar or stake of conductive material which may be readily driven into the ground 7 at a point remote from the apparatus 1. The other lead 5 terminates in the condenser plate 8 separated from the ground by a dielectric, which may be a piece of electrical insulating material 9 or the electrode may be held in spaced relation from the earth by other suitable means, whereby a condenser is formed between electrode 8 and the ground 7. The insulating material 9 may be of bakelite or other suitable dielectric material.

A third lead 10 may be connected with apparatus 1 by transferring the switch 11 from lead 5 to lead 10. Lead 10 terminates in an electrode plate 12 having the same electrical characteristics as plate 8 and being similarly spaced above the ground by a dielectric.

The source of high frequency alternating current 2 is adjusted to produce oscillations having a frequency, (which in a typical case, may be of the order of 10,000 cycles per second) but any suitable frequency may be used that will result in an appreciable current passing through a given condenser formed by one of the plate electrodes and ground. The electrostatic capacity of each plate electrode to ground is preferably proportioned to such a value that a suitable amount of current may be passed therethrough at the frequency of current derived from the source 2, so that a measurable current will pass through the indicator 3. The capacity of the electrode condensers may be proportioned in a well known manner as by adjusting the thickness of dielectric body 9 or the area of the electrode plate 8 or 12.

The switch 11 is then connected with lead 13 containing an impedance 14 of known value which may be a condenser having a capacity approximately equal that of one of the electrode condensers 7—8—9, the circuit through lead 13 being completed by way of lead 4, forming the return connection to source 2. Current transmitted through the standard impedance 14 produces a definite response in indicator 3 which makes it possible to adjust the energization of source 2 to a predetermined reproducable value and to check it during the operation of the apparatus.

It is thus possible to adjust the voltage of source 2 to a predetermined value which may be maintained throughout the operation. Switch 11 is then connected with lead 5 and current is transmitted from source 2 to plate 8 through dielectric 9 and into the earth 7, where the current distributes widely throughout conducting paths, as indicated generally by dotted lines 15, which diverge from plate 8 and converge at stake electrode 6. It has been found in practice that the impedance of the total conducting path through the described ground circuit, where no oil or substantial dielectric body is present, is of such low value in comparison with the impedance of the electrode condenser 7—8—9, as to produce no appreciable effect on the amount of current passing through the circuit, that is, the total impedance of the earth's circuit is so small in comparison to that of the electrode circuit, as to be negligible.

Referring, for example to Fig. 3, wherein the electrode condenser 7—8—9, is diagrammatically presented as condenser 16 and the lumped earth impedance is shown at 17. The total impedance of the circuit formed by connecting switch 11 with lead 5 is substantially unaffected by the presence of impedance 17, owing to the relatively higher impedance of condenser 16. It will, therefore, be evident that the response of indicator 3 to current from source 2 passing through impedance 16 will be substantially unaffected by impedance 17.

If now, the switch 11 be connected with lead 10, current from source 2 passes through condenser electrodes 7—9—12 and stake 6, producing a response in indicator 3 of the same value as before. This is due to the fact that the impedance of the short path through the ground is negligible in comparison to the impedance of condenser 7—9—12, as in the previous case. In Fig. 3, the condenser 19 represents the electrode condenser 7—9—12, while impedance 20 represents the lumped impedance of the earth circuit.

To illustrate how this relationship may hold, an arbitrary set of values may be assumed to apply in a given instance. For example, if the impedance of condensers 16 and 19 be the same and have a value of the order of 100,000 ohms and impedance 17 be of the order of 50 ohms, while impedance 20 be of the order of ten ohms, it will be obvious that the effect of impedance 17 when switch 11 is connected therewith is five parts in ten thousand approximately. It is, therefore, negligible in the case of any ordinary indicating instrument wherein the accuracy of an indication is ordinarily not better than one part in a thousand. In other words, any impedance added to that of condenser 16 must exceed one one-thousandth part of the impedance of condenser 16, in order to produce a positive indication on indicator 3. Hence, it will be seen that in the case shown in Figs. 1 and 3, where no oil or other dielectic deposit is present, the indication will be the same with the both readings.

Referring now to Fig. 2, the apparatus for detecting oil or other dielectric deposits is shown in position above a typical deposit of oil. In this instance the oil 21 is shown in a strata of oil-bearing sand, which is surrounded at its edges by a deposit of salt solution 22, surmounted by an impervious cap 23, such as sandstone or shale. The earth above and below the oil deposit, in substantially all cases, contains some moisture or electrical conducting material dispersed therethrough, thus providing numerous conducting paths in the medium above and below the oil and partaking of the nature of an electrical conductor.

When the switch 11 is connected with the condenser plate 8, currents distribute to the ground between electrodes 6 and 8 in the manner indicated by dotted lines 15, which extend down to the conducting surface above the old deposit 21. Owing to the dielectric properties of the oil deposit 21, the impedance between electrodes 8 and 6 is greatly increased over what would be the case if a dielectric body were not present. According to our present theories, this is due to the fact that the oil body acts as a condenser. When the switch 11 is connected with the lead 10 and electrode 12, the impedance of the path to the earth between the electrodes is relatively small and is not substantially affected by the presence of the oil. The difference in the two readings thus secured is indicated by full and dotted lines in Fig. 4, thus showing the presence of oil or other dielectric body.

The impedance 24 in Fig. 4 represents the high impedance of the long path between electrodes 6 and 8, while the impedance 20 represents the lumped impedance of the short path between electrodes 6 and 12. It will thus be seen that the indication of the instrument 3 will be larger when switch 11 is connected with impedance 20, than when connected with the higher impedance 24.

In the case of the circuit of Fig. 4, the condensers 16 and 19 may be assumed to have impedances corresponding to those assumed in connection with Fig. 3, that is to say each has an impedance of 100,000 ohms. The impedance 20 may be assumed to have the same value as in Fig. 3, that is ten ohms, while impedance 24 is very much larger in value than that of impedance 17 of Fig. 3, owing to the effect of the oil or other dielectric body.

It may be assumed, for purposes of illustration, that in a given instance, impedance 24 may be 20,000 ohms and thus the sum of impedances 16 and 24 will be much greater than the sum of impedances 19 and 20. The fact that the sum of the impedances 16 and 24 is much greater than the sum of the impedances 19 and 20 causes the indication of instrument 3 in the case of the short to be much greater than is the case when connected to the long path. We find, as a result of actual measurements, that the extent of the oil or other dielectric deposit may be very sharply defined in this way. When observations are made at points spaced only a relatively few number of feet away from and outside the area over an appreciable oil or dielectric deposit, the effect of the deposit appears to be negligible.

In order to ascertain the place of greatest concentration of an oil or dielectric deposit or a favorable place for suspecting the presence of such deposits, a series of observations may be made at different points, over a large area, with such distances between the points of observation as to indicate the general location and extent of the deposit. A more detailed location of the most highly concentrated deposits, where drilling will be made, may then be carried out by observing at points more closely positioned to each other, in the neighborhood of areas showing the greatest differential readings of instrument 3. The point at which the greatest differential reading, found in this way, occurs will be the place at which drilling should be carried on.

Generally it is desirable to take two reading at each point, the first reading being made in the normal manner and the second reading being made at right angles thereto in order that the two may substantially check. We have found, as a result of our observations, that in locating oil deposits, the instrument 3 indicates a steady value in the reading of the respective impedances of the long and short paths referred to and that when the dielectric body is a pocket or deposit of natural gas, the needle of the instrument 3, when measuring the relative impedance of the long path will fluctuate back and forth over a substantial arc. In this way, we are able to determine whether the deposit which has been located is oil or gas.

In Fig. 5, we show diagrammatically a suitable apparatus and circuits designed for the purpose of carrying our improved method into effect. The source of high frequency alternating current 2 is here shown as including the buzzer 25 energized by current from battery 26, this current passing also through the primary winding of transformer 27 and switch 28 for connecting or disconnecting the buzzer and battery. It has been found that the operation of buzzer 25 is more stable and free from undesirable fluctuations in frequency, when inductance coil 29 is inserted in series with the circuit of the buzzer and when the battery leads are shunted at each terminal of coil 29 by condensers 30. Inductance 29 is preferably of large value and may be an iron core inductance of the order of a fraction of a henry or greater, while condensers 30 are of the order of a micro-farad or greater. In a particular instance, the operation of buzzer 25 was found to be improved when inductance 29 had a value of approximately $\frac{1}{10}$ of a henry, while the condensers were each approximately four micro-farads capacity.

Buzzer 25 is adjusted to have a relatively high frequency of mechanical vibration, for example, in a typical case the armature may interrupt the circuit approximately 800 times per second. The interruption of current at the contacts of buzzer 25 gives rise to currents of high frequency in the buzzer circuit. The frequency used may vary within wide limits, but it is desirable that the frequency should not be so high that difficulty would be experienced from electrostatic or magnetic coupling in the apparatus.

It will be understood, of course, that instead of a buzzer, any other suitable source of high frequency current may be used, either generating a single pure sine wave of the desired frequency or a complex wave of many frequencies. Current from source 2 transmitted to the secondary winding of transformer 27 passes through primary winding of transformer 31 and lead 4 to stake 6 which is driven into the ground. The transformer 27 is preferably a step-up transformer, in order to increase the voltage applied to the ground. Transformer 31 is also preferably a step-up transformer, in order to provide a suitable secondary voltage for actuating the voltage sensitive detector 32. The circuit from the ground is completed to transformer 27 through electrode 8, lead 5 and switch 11.

When switch 11 is connected with lead 10 the ground circuit is completed through the other electrode 12. In order to provide a standard reference condition by which the source 2 may be adjusted to a predetermined energization so that a definite reference voltage is supplied for making all of the measurements, a fixed known capacity 14 may be connected in the earth circuit to provide a path for current to transformers 27 and 31, switch 11 being connected with lead 13.

The electrodes 6 and 8 are spaced a suitable distance apart, in order to secure a reading through a long path, such as we have above referred to, being connected to the source of alternating current by the leads 4 and 5. This spacing may vary within wide limits. We have secured effective results by spacing these electrodes approximately sixty feet apart but manifestly they may be very much more widely separated.

In effecting a reading of the impedance of the so-called short path, we place the electrode 12 in close proximity to the stake 6 and have secured effective results when this spacing in about five feet, but manifestly it may be less than this or more, depending upon the length of the so-called long path. If, for example, the electrodes 8 and 6 are separated a distance of 1,000 feet then the electrodes 12 and 6 may be separated 100 feet.

Leads 4, 5 and 10 are preferably approximately of the same length, in order that the apparatus will be located centrally between the electrodes 8 and 6. When switch 11 is connected with lead 13, the current transmitted through primary of transformer 31 induces a voltage in the secondary winding which is transmitted to the grid and cathode of the detector tube 32. The plate circuit of the tube 32 includes the source of direct current 35 in series with the relatively high resistance 36 of such value as to pass a suitable amount of space current therethrough and produce an appreciable voltage thereacross. In a given case we have found that with a well known type of detector tube having normal space current of about 1 milliampere, the resistance 36 may have a value of about 5,000 ohms, the source 35 having a voltage of about 45 volts which may be adjusted by means of variable resistance 37.

The voltage across resistance 36 produces a current to operate the indicator 38 which may be a sensitive current indicating instrument, such as a micro-ammeter, having a full scale deflection of a few microamperes.

In order to prevent a continuous current passing through indicator 38 at times when no alternating current is impressed upon the grid of the detector, an opposing voltage is impressed in series with indicator 38 by means of the potentiometer 39 connected in parallel with the source of filament current 40, the voltage of which is controlled by rheostat 41 and is indicated by volt meter 42, this voltage being maintained constant throughout the measurements by adjustment of rheostat 41.

In order to provide a fine adjustment of voltage obtained from potentiometer 39, a second potentiometer 43 is connected in series between the sliding contacts on potentiometer 39, the sliding contact of potentiometer 43 being connected directly with the indicator 38. By adjusting the sliding contact on potentiometer 39, a coarse adjustment of the opposing voltage may be obtained, and the fine adjustment is obtained by varying the sliding contact of potentiometer 43, so that when no alternating current is being detected, the deflection of indicator 38 is zero or any other standard reference point.

The normal potential of the grid of detector 32 is determined by the source of voltage 44. Condenser 45 is connected in shunt with the source 44 and condenser 46 is connected between the cathode and plate of the tube to provide a path for alternating components of current in the grid and plate circuits.

Before making any measurements, the voltmeter 47 is connected by switch 48 with the grid polarizing source 44 to insure that it has the proper value. Similarly, voltmeter 47 is connected by switch 48 across the source 35 and rheostat 37 is adjusted to maintain the proper voltage for the plate circuit. Voltage applied to the filament of the tube is held constant by rheostat 41. Potentiometers 39 and 43 are then adjusted until the desired indication is obtained on instrument 38, usually being zero.

By closing the switch 11 on lead 13 a current of a value determined by the impedance of condenser 14 produces an indication on instrument 38 as a result of the rectifying or detecting action of tube 32. At the same time the inherent amplifying characteristic of tube 32 increases the response obtainable from the small current passing through the primary winding of transformer 31. In general, the grid, plate and filament voltages applied to tube 32 are so chosen that the tube operates below the center of its plate-current grid-voltage characteristic, in order that the detector tube may operate in response to a large range of current values without being blocked at the ends of its plate-current grid-voltage characteristic.

Switch 11 is now connected with lead 5 and the current passing through the long path between electrodes 6 and 8 produces an indication on meter 38 as a function of the impedance in the earth between these electrodes. Switch 11 is then connected with lead 10, and the current passing between electrodes 6 and 12 produces an indication on meter 38 as a function of the impedance of the short path through the earth between electrodes 6 and 12. As explained above in connection with Figs. 2 and 3, when the indication on the meter 38 is the same for both the long and short path measurements, no oil or other dielectric deposit is located below the area including the electrodes, while if the indication of meter 38 in response to current through the long path differs from that produced by current through the short path, the presence of oil or other dielectric deposit is indicated and the amount of this difference shows the approximate quantity of such deposit below the area where the measurement is made. As pointed out, when a difference in the measurements is observed and is accompanied by a fluctuation of the instrument needle while measuring current in the so-called long path, the presence of natural gas is indicated.

The embodiment of the apparatus described above is illustrative of one form of means for carrying out our improved method and employs a standard voltage impressed between electrodes connected to the earth, the amount of current produced by that voltage being measured or otherwise detected. Obviously, the electrical energy employed for measuring the difference between the impedances of the long and short paths may be applied in various other ways. For example, a constant alternating current may be transmitted through the long and short paths and the voltage required to produce this current across the long path may be compared with the voltage required to produce the same current through the short path and if the two voltage measurements are different, the presence of oil or other dielectric is indicated.

Since the current measured by this apparatus may be of the order of a very few microamperes, the electrostatic capacity and the magnetic coupling between different parts of the circuit within the apparatus and the electrostatic or magnetic coupling with objects external to the apparatus may induce such serious interference in the desired operation of the circuit as to entirely mask the effects to be indicated on the meter. It is, therefore, very important to guard against electrostatic and magnetic coupling between leads and other parts of the apparatus where such coupling is not essential to the operation of the circuit. For example, it will be noted in Fig. 5 that the secondary winding of transformer 31 is shown with its connections reversed with respect to its primary. Similar precautions in preventing or neutralizing or shielding against undesirable capacity and inductive coupling within the apparatus have been fully worked out in the radio art, and the expedients adopted in that art for this purpose can be utilized here.

Electrodes 8 and 12 preferably have the same surface area. The area of these electrodes is such that they provide an electrostatic capacity to ground adding an impedance which is relatively high in comparison to the impedance of the earth between the spaced electrodes.

For convenience in spacing electrodes 8 and 12 from the surface of the earth, an insulating material such as bakelite or other suitable material in the form of a sheet or panel may be placed between each plate and the ground, so that the plate is supported upon the insulation as represented diagrammatically in Fig. 1. In our own carrying out of the method we have made use of electrodes having an area of about 1,000 square centimeters spaced from the ground by panels of bakelite approximately about .5 centimeter thick. Such condensers are portable and rugged, but obviously they may be varied widely in their dimensions and other means for spacing the electrode from the surface of the earth may be used to obtain an equivalent effect. The combination of the electrode with the insulating plate between the electrode and the ground provides means for applying current electrostatically to the surface of the earth and in describing our method in the appended claims, such phrases as "applying high frequency alternating current electrostatically to the surface of the earth" are intended to refer to the use of the electrode and insulating plate as above described.

We have found in the operation of our apparatus in certain localities where the soil is exceptionally dry that condensers comprising plates spaced from the earth by means of a dielectric are not necessary. In such cases a stake may be substituted for one or both of the electrode condensers, the effect of the electrode condenser being simulated by the dielectric effect of the dry sand or other soil, spacing the electrode from the conducting medium below.

Having now described our invention, what we claim as new therein and desire to secure by Letters Patent is as follows:

1. The method of detecting the presence of oil or other dielectric deposits below the surface of the earth, which comprises applying high frequency alternating current electrostatically to the surface of the earth between points close to each other, applying said current between points more remote from each other, the short and long current paths thus formed being substantially in line and observing any difference between said currents, as an indication of the presence of such deposits, substantially as set forth.

2. The method of measuring the amount of oil or other dielectric deposit below a given portion of the earth's surface, which consists in comparing the strength of the high frequency alternating current electrostatically applied to the surface of the earth between points relatively close together and between points relatively remote from each other and substantially in line with the first mentioned points, substantially as set forth.

3. The method of detecting the presence of oil or other dielectric deposits below the surface of the earth, which comprises applying high frequency electric current of pre-determined voltage electrostatically to the surface of the earth between points relatively close together, measuring said current, applying said current electrostatically to the earth between points remote from each other, measuring said current, and observing the difference between said measurements, as an indication of the quantity of the deposit below the surface where said measurements are made, substantially as set forth.

4. Apparatus for detecting the presence of oil or other dielectric deposits beneath the surface of the earth which comprises means for producing a high frequency electric current, and means for applying said current to the earth's surface at one time between electrodes relatively close together and at another time between electrodes relatively spaced apart, the impedance of said electrodes being sufficiently high to make the normal impedance of the earth through the two paths negligible, but in the presence of a dielectric deposit to make the impedance of the path included in the same a measurable one, substantially as set forth.

5. The method of detecting the presence of oil or other dielectric deposits beneath the surface of the earth, which comprises transmitting a high frequency electric current through a known impedance of relatively high value in series with a relatively long path through the earth and in series with a relatively short path through the earth and observing the difference, if any, between the impedance of said paths, substantially as set forth.

6. In a system for detecting the presence of oil or other dielectric deposit below the surface of the earth, a source of high frequency alternating current, means for transmitting current from said source electrostatically through a short path and a relatively long path below the earth's surface, and means for indicating the characteristics of said paths.

7. In a system for detecting the presence of oil or other dielectric deposits below the earth's surface, a source of high frequency alternating current, means for electrostatically transmitting current from said source through a short path and a relatively long path below the earth's surface, said paths being substantially in line and means for indicating the characteristics of said paths.

8. In a system for detecting the presence of oil or other dielectric deposits beneath the surface of the earth, a source of high frequency alternating current, means for transmitting said current through the earth, said means including a relatively high impedance element as compared with the impedance of the earth where no such deposit is present, and means for determining the presence of additional impedance due to a dielectric deposit, substantially as set forth.

9. In a system for detecting the presence of oil or other dielectric deposits, the combination of a source of high frequency alternating current, an electrode in circuit therewith for supplying current to the earth, two other electrodes of the condenser type adapted to be alternately connected with said source, one being located relatively near the first electrode and the other relatively remote therefrom, whereby the circuit through the earth may be closed between the first electrode and either of the two other electrodes, substantially as set forth.

10. In a system for detecting the presence of oil or other dielectric deposits below the surface of the earth, a source of alternating current, a circuit for transmitting said current into the earth including an electrode of the condenser type, means for transmitting current from said source to said circuit, an electrical indicator, and voltage-increasing means for transmitting current from said earth circuit to said indicator, substantially as set forth.

11. In a system for detecting the presence of oil or other dielectric deposits below the surface of the earth, a source of alternating current, a circuit for transmitting said current into the earth including an electrode of the condenser type, voltage-increasing means for transmitting current from said source to said circuit, and an electrical indicator coupled with said circuit, substantially as set forth.

12. In a system for detecting the presence of oil or other dielectric deposits below the surface of the earth, a source of alternating current, a circuit for transmitting said current into the earth electrostatically, a voltage-increasing means for transmitting current from said source to said circuit, an electrical indicator, and voltage-increasing means for transmitting current from said earth circuit to said indicator, substantially as set forth.

13. In a system for detecting the presence of oil or other dielectric deposits below the surface of the earth, a source of alternating current, means for making a substantially direct connection from one terminal of said source to the earth, means for making a relatively high impedance connection from the other terminal of said source to the earth, and means coupled with said direct connecting means for indicating the current transmitted to earth, substantially as set forth.

14. In a system for detecting the presence of oil or other dielectric deposits below the surface of the earth, a source of high frequency current, an electrode adapted to form a condenser with the earth, an electrode adapted to conductively contact with the earth, a circuit for connecting said source with said electrodes, and means connecting with said circuit between said source and said conductively connecting electrode for indicating the current transmitted therethrough, substantially as set forth.

LOUIS C. BILLOTTE.
EDWARD LIPSON.